United States Patent [19]

Hasebe

[11] Patent Number: 5,018,611

[45] Date of Patent: May 28, 1991

[54] PINION CLUTCH FOR STARTER

[75] Inventor: Nobutoshi Hasebe, Ibaraki, Japan

[73] Assignees: Hitachi, Ltd., Tokyo; Hitachi Automotive Engineering Co., Ltd., Ibaraki, both of Japan

[21] Appl. No.: 426,049

[22] Filed: Oct. 24, 1989

[30] Foreign Application Priority Data

Oct. 27, 1988 [JP] Japan ................................ 63-271425

[51] Int. Cl.[5] ........................ F02N 11/00; F16D 41/06

[52] U.S. Cl. ................................................ 192/42; 74/6

[58] Field of Search ............... 192/42; 74/6, 7 A, 7 C, 74/7 R

[56] References Cited

U.S. PATENT DOCUMENTS

| | | | |
|---|---|---|---|
| 2,117,230 | 5/1938 | Thornburg . | |
| 2,871,708 | 2/1959 | Raver | 74/6 |
| 3,327,821 | 6/1967 | Digby . | |
| 3,686,961 | 8/1972 | Campbell | 74/7 R |
| 3,714,834 | 2/1973 | Digby | 74/6 |
| 4,346,615 | 8/1982 | Yoneda et al. | 74/7 A |

FOREIGN PATENT DOCUMENTS

| | | | |
|---|---|---|---|
| 479627 | 4/1953 | Italy | 74/6 |
| 0074748 | 6/1977 | Japan | 74/6 |
| 54-30061 | 9/1979 | Japan . | |

OTHER PUBLICATIONS

European Search Report EP 89 11 9731, 9/90.

*Primary Examiner*—Rodney H. Bonck
*Attorney, Agent, or Firm*—Antonelli, Terry, Stout & Kraus

[57] ABSTRACT

A pinion clutch for a starter is constituted such that a spline tube having first and second helical splines on the inner and outer surfaces thereof respectively is disposed on a drive shaft, the inner surface of the spline tube is engaged to the drive shaft by the first helical spline, while the outer surface of the spline tube is engaged to a clutch-outer by the second helical spline, and rollers are disposed between a clutch-inner which is integrally formed with a pinion and the clutch-outer so that a one-way clutch function is realized. The pinion clutch comprises a meshing spring and an impact torque absorbing spring urging the spline tube and the clutch-outer in a direction in which the spline tube and the clutch-outer move away from each other are in series disposed between the spline tube and the clutch-outer. The meshing spring and the impact torque absorbing spring have individual spring constants.

5 Claims, 2 Drawing Sheets

PINION CLUTCH FOR STARTER

BACKGROUND OF THE INVENTION

The present invention relates to a pinion clutch for a starter, and, more particularly, to a pinion clutch capable of improving reliability in pinion meshing and of reducing impact torque which can be generated upon meshing As disclosed in Japanese Patent Examined Publication No. 54-30061, conventional pinion clutches for starters are arranged such that a spline tube is disposed on a drive shaft, with the spline tube having a first helical spline on the inner surface thereof and a second helical spline on the outer surface of the same. Thus, the inner surface of the spline tube is engaged to the drive shaft through the first helical spline, while the outer surface of the spline tube is engaged to a clutch-outer through the second helical spline. Furthermore, rollers are disposed between a clutch-inner and the clutch-outer, the clutch-inner being integrally formed with the pinion. Thus, a pinion clutch having a one-way clutch function is achieved. In addition, a meshing spring capable of being elastically deformed in the axial direction, when the pinion strikes the ring gear of an engine, is disposed between a sleeve and the clutch-outer, with the sleeve being capable of moving the pinion clutch in the axial direction. Another spring is so disposed between the spline tube and the drive shaft as to be capable of being elastically deformed in the axial direction. As a result, impact torque can be absorbed when the pinion meshes with the ring gear of the engine.

In the conventional pinion clutch of the type described above, the second helical spline on the outer surface of the spline tube is adapted to be meshed with the pinion. The function of the helical spline of this type is the same as that of a conventional pinion clutch which is previous to the above-described conventional clutch, the helical spline of the previous conventional pinion clutch being of the type capable of causing the clutchouter to be engaged to the drive shaft through a single helical spline. That is, the torsional direction of the helical spline is arranged to be in the direction opposite to the rotation of the drive shaft. Therefore, when the sleeve is moved, the pinion is, by the action of the helical spline, caused to move forward and rotated in the direction opposite to the rotation of the drive shaft to be brought into contact and meshed with the ring gear thereafter. The pinion in mesh with the ring gear is caused to further move forward by the action of the helical spline due to the torque of the motor which rotates the drive shaft.

On the other hand, the first helical spline formed on the inner surface of the spline tube is provided for the purpose of absorbing impact torque which can be generated when the pinion meshes with the ring gear, the helical spline being arranged to be twisted in the same direction as that of the rotation of the drive shaft. Therefore, a clip is used to secure the end portion of the spline tube in order to prevent the spline tube from moving toward the ring gear, such clip being located at the end portion of the spline in the direction in which the spline tube moves. As a result, when the pinion meshes with the ring gear and impact torque is thereby generated, the pinion strikes the pinion stopper and the spline tube is retracted in the direction opposite to the ring gear by the action of the helical spline. This leads to the fact that the above-described spring for absorbing the impact torque is so deflexed as to absorb the impact torque.

In the conventional pinion clutch, the two helical splines respectively formed on the inner and outer surfaces of the spline tube do not act in cooperation with each other when the pinion meshes with the ring gear. The helical spline formed on the outer surface acts solely. Similar to the single helical spline of the previous conventional pinion clutch, the conventional helical spline simply causes the pinion to move forward after the pinion has meshed with the ring gear, that is, the helical spline performs a meshing action. The conventional helical spline cannot eliminate the possibility of failure in establishing the meshing when the pinion strikes the ring gear. Therefore, reliability in the meshing cannot be improved. In other words, the above-described conventional pinion clutch has been arranged such that the performance of absorbing impact torque and reliability in pinion meshing are improved by individual means. No pinion clutch in which the performance of absorbing impact torque and the reliability in pinion meshing are simultaneously improved has yet been realized.

SUMMARY OF THE INVENTION

To this end, an object of the present invention is to provide a pinion clutch for a starter capable of simultaneously improving the performance of absorbing impact torque and reliability in pinion meshing.

The above-described object can be realized by a structure arranged such that a meshing spring and an impact torque absorbing spring urging the spline tube and the clutch-outer in a direction in which the spline tube and the clutch-outer move away from each other are in series disposed between the spline tube and the clutch-outer, with each such spring possessing an individual spring constants.

Since the major portion of the roll of the first helical spline formed on the inner surface of the spline tube is to establish the pinion meshing, the direction of the torsion thereof is arranged to be opposite to that of rotation of the drive shaft.

On the other hand, the second helical spline formed on the outer surface of the spline tube acts to assist the pinion meshing action and to absorb impact torque, the direction of the torsion thereof being arranged to be the same as that of rotation of the drive shaft.

According to the thus structured pinion clutch of the present invention, the meshing spring is deformed to absorb the axial force when the pinion strikes the ring gear of the engine. Simultaneously, the forward movement of the pinion and the rotation of the same are restricted, causing the spline tube to move forward with respect to the clutch-outer due to the action of the second helical spline formed on the outer surface of the spline tube. As a result, the clutch-outer is intended to displace itself by a degree of the torsional angle of the second helical spline corresponding to the amount of the relative movement of both the clutch-outer and the spline tube. This causes the pinion which is integrally formed with the clutch-outer to be moved in the circumferential direction or a meshing force is applied to the crest of the gear. As a result, the probability of error in engagement can be reduced, and therefore, reliability in meshing can be improved. After the pinion meshes with the ring gear of the engine, the pinion further moves forward within the ring gear by the action of the first helical spline formed on the inner surface of the spline tube until it comes into contact with the pinion stopper and the pinion meshes with the ring gear completely.

As for the generation of the impact torque when the pinion strikes the ring gear, since drive torque of the motor acts on the drive shaft in a state that the pinion is in contact with the pinion stopper, an axial force in the direction in which the clutch-outer and the spline tube approach to each other is generated by the action of the second helical spline formed on the outer surface of the spline tube. The axial force thus generated causes the meshing spring with a relatively smaller spring constant to be deformed. Then, the impact torque absorbing spring is so deformed as to absorb the impact torque.

DESCRIPTION OF THE PREFERRED EMBODIMENT

Figure 1:
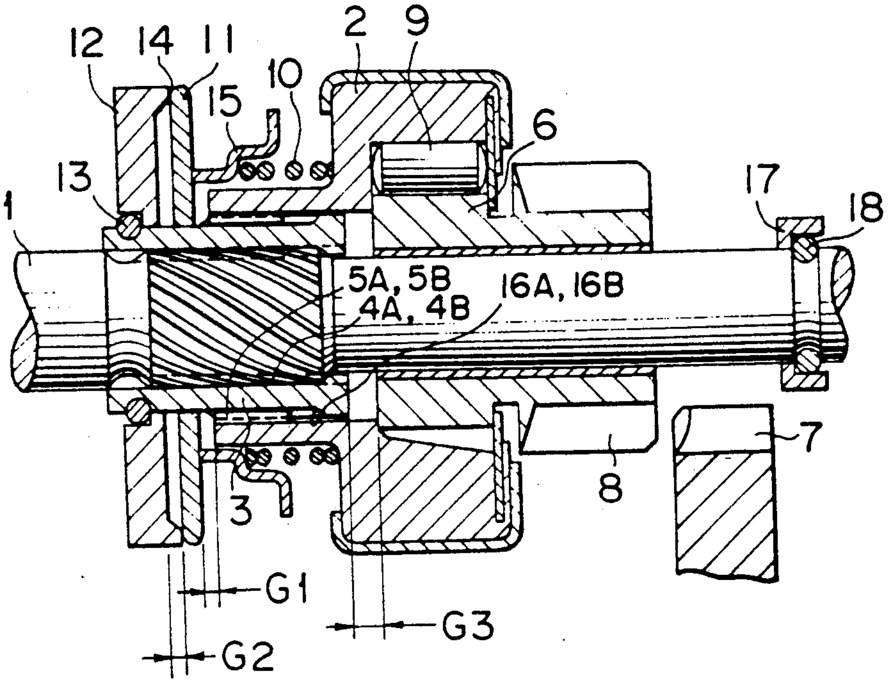
FIG. 1 is a cross sectional view which illustrates an embodiment of a pinion clutch for a starter according to the present invention.

Referring to FIG. 1, a pinion clutch according to this embodiment includes a drive shaft 1 capable of transmitting power of a motor when an engine is started. A spline tube 3 capable of transmitting the power to a clutch-outer of the pinion clutch is disposed on the drive shaft 1. A first helical spline 4A is formed on the inner surface of the spline tube 3, while another first helical spline 4B is formed on the outer surface of the drive shaft, with the first helical spline 4B corresponding to the first helical spline 4A. As a result, the spline tube 3 is joined to the drive shaft 1 through the first helical splines 4A and 4B. On the other hand, a second helical spline 5A is formed on the outer surface of the spline tube 3, while another second helical spline 5B is formed on the inner surface of the clutch-outer 2, with the second helical spline 5B corresponding to the second helical spline 5A. As a result, the spline tube 3 is joined to the clutch-outer 2 through the second helical splines 5A and 5B. As described later, the first helical splines 4A and 4B are designed such that the helical direction thereof is arranged to be in the direction opposite to that of the rotation of the drive shaft 1 for the purpose of mainly contributing the pinion meshing action. On the contrary, the second helical splines 5A and 5B are designed such that the helical direction thereof is arranged to be in the same direction as that of the rotation of the drive shaft 1 for the purpose of conducting, as described later, both an assisting action of pinion meshing and an impact torque absorbing function.

A clutch-inner 6 is slidably supported on the drive shaft 1. At an end of the clutch-inner 6 there is provided an integrally formed pinion 8 which is arranged to be meshed with the ring gear 7 of the engine.

The clutch-outer 2 of the pinion clutch has a profile of the inner surface thereof with which a one-way clutch function can be established. Rollers 9 are disposed between the surface of the profile and the clutch-inner 6. Thus, the pinion clutch having a one-way clutch function is formed by the clutch-outer 2, the rollers 9, roller pushing springs (not shown), and the clutch-inner 6.

Between the clutch-outer 2 and the tube 3 there is provided a meshing spring 10 urging both the clutch-outer 2 and the tube 3 in the direction in which they move away from each other and an impact torque absorbing spring 11 and the meshing spring 10 are disposed in series. Specifically, the meshing spring 10 is a coil spring disposed around the outer surface of the clutch-outer 2. The impact torque absorbing spring 11 is a belleville spring disposed around the outer surface of the spline tube 3 and is positioned in contact with and supported by an equalizing ring 12 disposed on an end portion of the spline tube 3 at the circumferential portion of a surface opposite to the clutch-outer 2. The equalizing ring 12 is secured by a clip 13 and is arranged so as to bear a load of the impact torque absorbing spring 1 by a flat surface 14 formed on the outer surface thereof. Between the meshing spring 10 and the impact torque absorbing spring 11 there is provided a sleeve 15 movable by a shaft lever (not shown) for moving the the pinion clutch in the axial direction. As a result, the meshing spring 10 is disposed between the sleeve 15 and the clutch-outer 2 and an end of the sleeve 15 is positioned in contact with and held by the impact torque absorbing spring 11. The meshing spring 10 is so arranged as to have the smaller spring constant than that of the impact torque absorbing spring 11 and also to have the maximum spring load smaller than that of the impact torque absorbing spring 11.

As a result of the above-described arrangement of the springs 10 and 11, the spline tube 3 and the clutch-outer 2 are urged by the reaction force of the meshing spring 10 in an axial direction in which they move away from each other. The stopping of the moving away of the spline tube 3 and the clutch-outer 2 due to the urging force of the springs is effected by flat surfaces 16A, 16B which are respectively formed on the spline tube 3 and the clutch-outer 2 and are engageable with each other. Under this condition, a gap B1 is maintained between the front portion of the clutch-outer 2 and the impact torque absorbing spring 11 while a gap G2 is maintained between the inner end of the impact torque absorbing spring 11 and the equalizing ring 12. In addition, a gap G3 is maintained between the spline tube 3 and the clutch-inner 6. The relationship between gaps G1, G2, and G3 can be expressed by $G1+G2<G3$.

A pinion stopper 17 is provided on the drive shaft and it is secured by a clip 18. The pinion stopper 17 serves as a stopper against the movement of the whole of the pinion clutch in the direction of the right as viewed in the drawing due to the movement of the spline tube 3 by the action of the first helical splines 4A and 4B.

Figure 2:
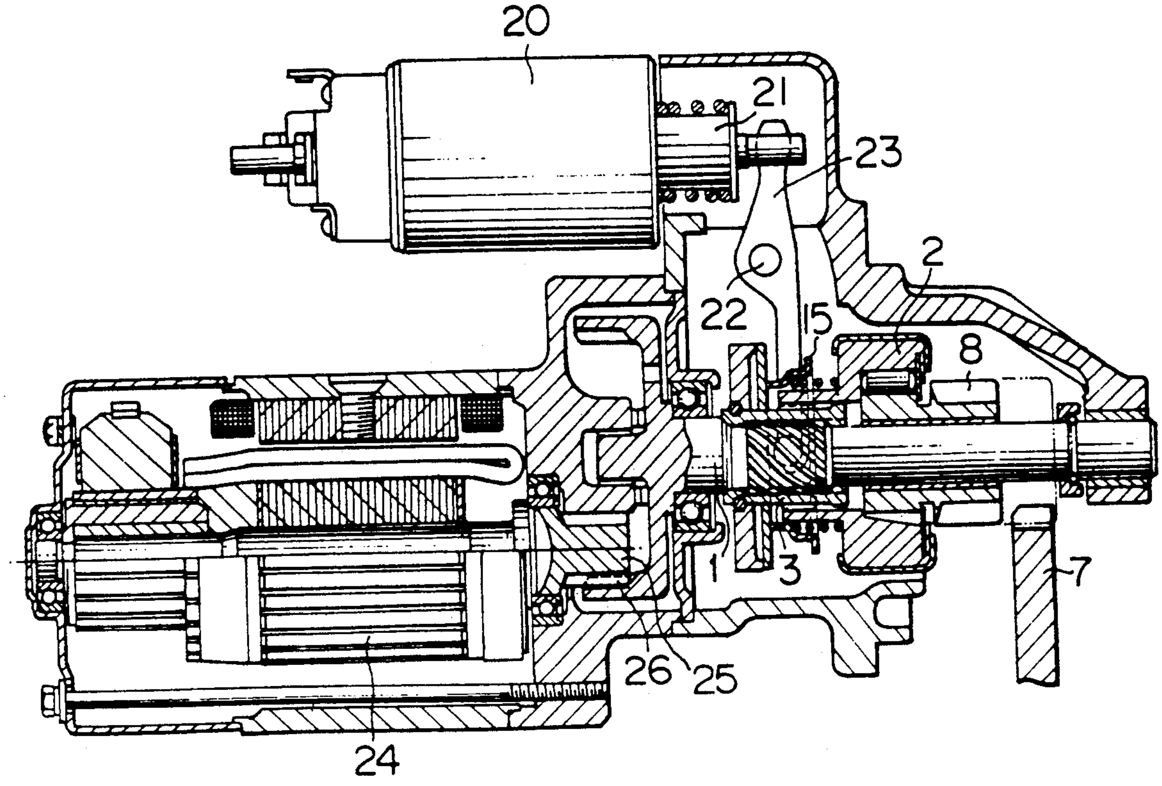
FIG. 2 is a cross sectional view which illustrates the structure of the starter with the pinion clutch according to the present invention.

Referring to FIG. 2, reference numeral 20 represents a magnet switch capable of generating an attracting force when an internal coil thereof is magnetized. The attracting force thus generated acts on a plunger 21 to move it in the leftward direction as viewed in FIG. 2. A shift lever 23 is connected to the plunger 21 and it is pivotally supported by a fulcrum 22. A front portion of the shift lever 23 is engaged to the sleeve 15 of the pinion clutch. When the plunger 21 moves to the left in the drawing, the front portion of the shift lever 23 moves to the right in the drawing, so that the pinion 2 is moved to the right in the drawing through the sleeve 15. Reference numeral 24 represents a motor arranged such that an output shaft 25 thereof is connected to the drive shaft 1 through a reduction gear 26, and thus the power therefrom is transmitted to the drive shaft 1 through the reduction gear 26.

In operation, when the coil of the magnet switch 20 is magnetized, an axial force in the direction of the right in the drawings is caused to act on the sleeve 15 by the plunger 21 through the shift lever 23. The axial force thus acts on the sleeve 15 and causes the clutch-outer 2 to move to the right in the drawing through the meshing spring 10 and further the pinion 8 to the right in the drawing.

When the pinion 8 strikes the ring gear 7, the meshing spring 10 is deformed to absorb the shock due to the collision. As a result, the axial force due to the meshing action is absorbed. This leads to the fact that wear and damage of the pinion 8 and the ring gear 7 due to the collision can be reduced.

Figure 3:
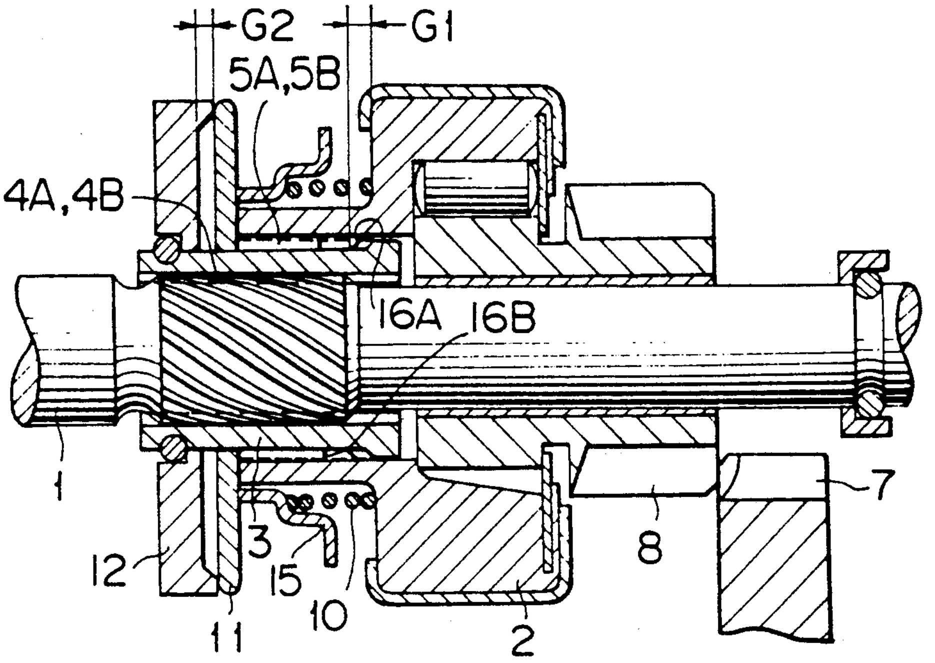
FIG. 3 is a cross sectional view which illustrates a state of the pinion clutch according to the present invention in which the pinion thereof is displaced.

Simultaneously with this, the rotation and the forward movement of the pinion 8 are restricted by the contact of the pinion 8 with the ring gear 7. Therefore, a force causing a movement of the clutch-outer 2 and the spline tube 3 in the direction in which they approach to each other is generated by the action of the second helical splines 5A and 5B formed on the outer surface of the spline tube 3. Since the contact between the pinion 8 and the ring gear 7 is maintained by the actions of the first helical splines 4A and 4B formed on the inner surface of the spline tube 3, the spline tube 3 is, as shown in FIG. 3, moved with respect to the position of the clutch-outer 2. As a result, the clutch-outer 2 is intended to displace by an angular degree of the torsion of the second helical splines 5A and 5B corresponding to the amount of the relative movement of the clutch-outer 2 and the spline tube 3. Therefore, the pinion 8 integrally formed with the clutch-outer 2 moves in the circumferential direction or a meshing force acts at the crest of the gear. Consequently, the possibility of error in meshing action can be eliminated and reliability in the meshing is improved.

The movement of the clutch-outer 2 and the spline tube 3 in the direction in which they approach to each other lightens the axial force (a force to push the pinion 8 to the side surface of the ring gear 7) to the pinion 8. As a result, wear caused from the contact of the pinion 8 with the ring gear 7 after the striking of the same can be reduced, and the durability against the repeated meshing actions can be significantly improved in cooperation with the axial force absorbing function at the collision realized by the meshing spring 10.

After the pinion 8 has been in mesh under the lightened axial force, the pinion 8 moves forward within the ring gear 7 by the actions of the first helical splines 4A and 4B formed on the inner surface of the spline tube 3 until it comes into contact with the pinion stopper 17, so that the pinion 8 is completely meshed with the ring gear 7.

Figure 4:
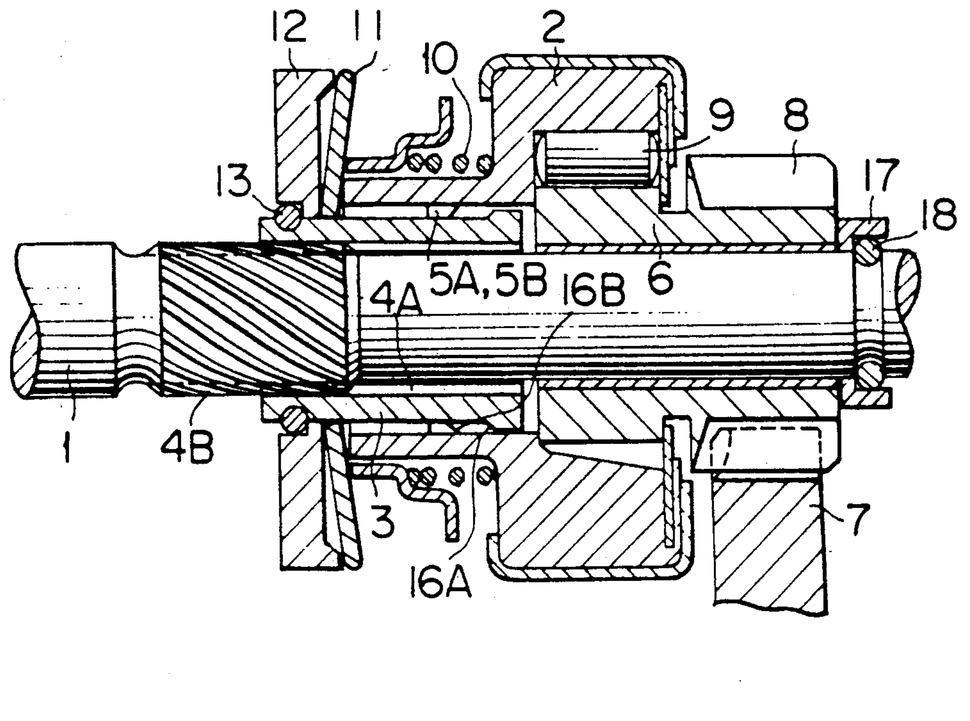
FIG. 4 is a cross sectional view which illustrates a state of the pinion clutch according to the present invention in which impact torque is absorbed.

On the other hand, with respect to the impact torque generated when the pinion 8 meshes with the ring gear 7, the pinion clutch acts as shown in FIG. 4. Referring to FIG. 4, the pinion 8 is positioned in contact with the pinion stopper 17. Under this condition, when the torque of the motor 24 is transmitted to the drive shaft 1 through the reduction gear 26, an excessive force is applied to the pinion 8 from the ring gear 7 since the ring gear 7 has not been sufficiently rotated. As a result, the spline tube 3 is intended to move forward in the right direction in the drawing by the actions of the first helical splines 4A and 4B formed on the inner surface of the spline tube 3. On the other hand, the clutch-outer 2 is intended to move rearward in the drawing by the actions of the second helical splines 5A and 5B formed on the outer surface of the spline tube 3. Therefore, a thrust force in the direction in which the clutch-outer 3 and the spline tube 2 approach to each other is generated. By the thrust force, the gap G1 between the clutch-outer 2 and the impact torque absorbing spring 11 is reduced to zero. On the contrary, a gap corresponding to the gap G1 is created between the stoppers 16A and 16B of the spline tube 3 and the clutchouter 2. During this, the meshing spring 10 having a smaller spring constant is deformed so that the impact torque is initially absorbed. Then, the rear surface of the clutch-outer 2 presses, as shown in FIG. 4, the inner portion of the impact torque absorbing spring 11. As a result, the impact torque absorbing spring 11 is deformed to reduce the size of the gap G2. In this state, the load corresponding to the spring constant of the impact torque absorbing spring 11 and energy required to deform the same become energy capable of absorbing the impact torque, so that the impact torque can be lightened.

After the rotation of the pinion 8 has been sufficiently transmitted to the ring gear 7, the torque acting on the pinion 8 is reduced, causing the clutchouter 2 to be returned forward by the forces of the springs 10 and 11 to be, as shown in FIG. 1, returned to the initial position with respect to the position of the spline tube 3.

According to this embodiment, since the meshing spring 10 and the impact torque absorbing spring 11 are, as described above, disposed in series between the clutchouter 2 and the spline tube 3, errors in meshing of the pinion 8 with the ring gear 8 can be eliminated, that is, reliability in the meshing can be improved and also an excessive impact torque generated after the meshing can be absorbed.

Since the second spline so acts as to weaken the axial force when the pinion 8 strikes the ring gear 7, the shock due to the striking can be further effectively absorbed in comparison with the effect in absorption achieved by a structure in which only the meshing spring acts to absorb the shock, and life can be significantly lengthened.

Furthermore, since also the meshing spring 10 contributes to the absorption of the impact torque, the impact torque absorbing performance can be improved.

Since the impact torque can be absorbed as described above, impact torque transmitted to a mechanical portion around the reduction gear 26 can be reduced and the size and weight of the mechanical portion of the starter can be thereby reduced.

In addition, since the thrust force generated when the impact torque is absorbed is converted into the relative approaching movement between the clutch-outer 2 and the spline tube 3, no thrust force is transmitted to the drive shaft 1. Therefore, an advantage in terms of the strength of the drive shaft 1 can be obtained in comparision with the conventional pinion clutch in which the thrust force acts on the drive shaft. As a result, the size of the drive shaft 1 can be reduced and also the size and weight of the pinion clutch can be reduced.

According to the present invention, both excellent impact torque absorbing performance and reliability in pinion meshing can be achieved. Consequently, the size and weight of the starter can be reduced with an excellent meshing reliability retained.

What is claimed is:

1. A pinion clutch for a starter comprising a spline tube having first and second helical splines on respective inner and outer surfaces thereof disposed on a drive shaft, said inner surface of said spline tube is engaged to said drive shaft by said first helical spline, while said outer surface of said spline tube is engaged to a clutch-outer by said second helical spline, and rollers disposed between a clutch-inner which is integrally formed with a pinion and said clutch-outer so that a one-way clutch function is realized, characterized in that:

a meshing spring and an impact torque absorbing spring urge said spline tube and said clutch-outer in opposite directions, said meshing spring and said impact torque absorbing spring are arranged in series and are disposed between said spline tube and said clutch-outer, and wherein said meshing spring has a spring constant less than a spring constant of said impact torque absorbing spring.

2. A pinion clutch for a starter according to claim 1, wherein said impact torque absorbing spring comprises a belleville spring.

3. A pinion clutch for a starter according to claim 1, wherein a sleeve for moving said pinion clutch in the axial direction is disposed between said meshing spring and said impact torque absorbing spring.

4. A pinion clutch for a starter according to claim 1, wherein means for bearing a spring force of said impact torque absorbing spring and means for holding said spring bearing means in the axial direction are provided at an end portion of said spline tube on the side opposite to said pinion.

5. A pinion clutch for a starter according to claim 1, wherein a helical direction of said first helical spline is arranged to be opposite to the direction of the rotation of said drive shaft while a helical direction of said second helical spline is arranged to be the same as the direction of the rotation of said drive shaft.

* * * * *